L. MAZZOCCO.
MEASURING DEVICE.
APPLICATION FILED APR. 9, 1920.
1,369,346.
Patented Feb. 22, 1921.
2 SHEETS—SHEET 1.
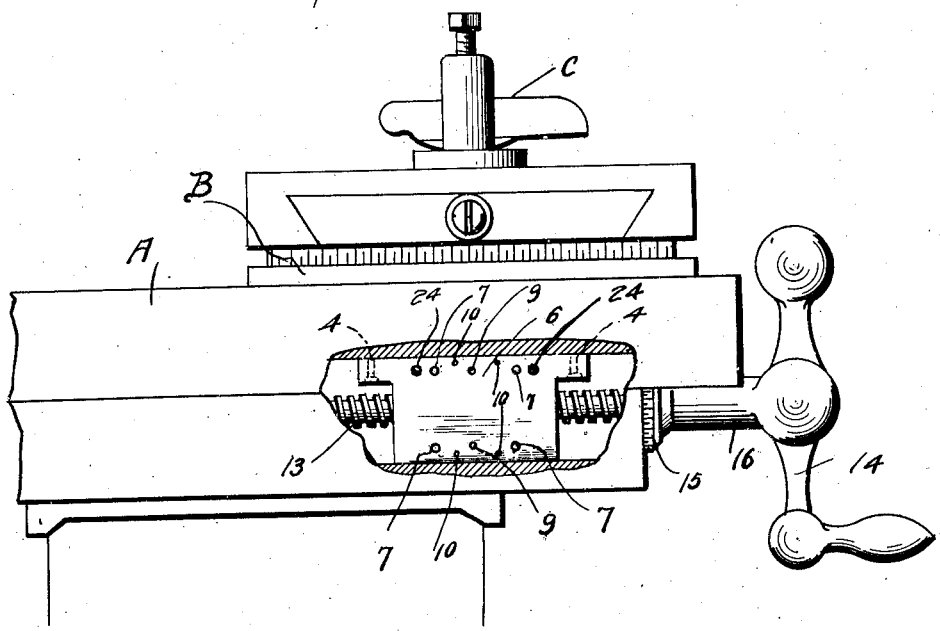
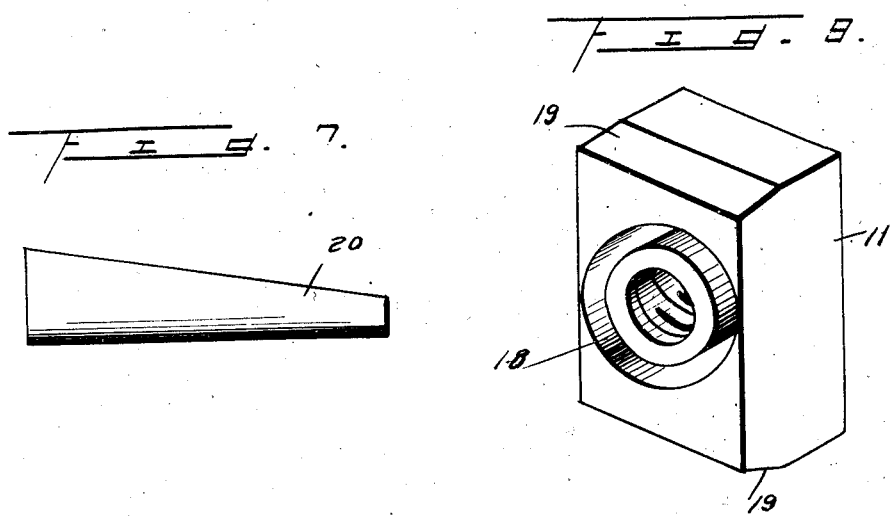
Inventor
L. Mazzocco.
By *[signature]*
Attorney

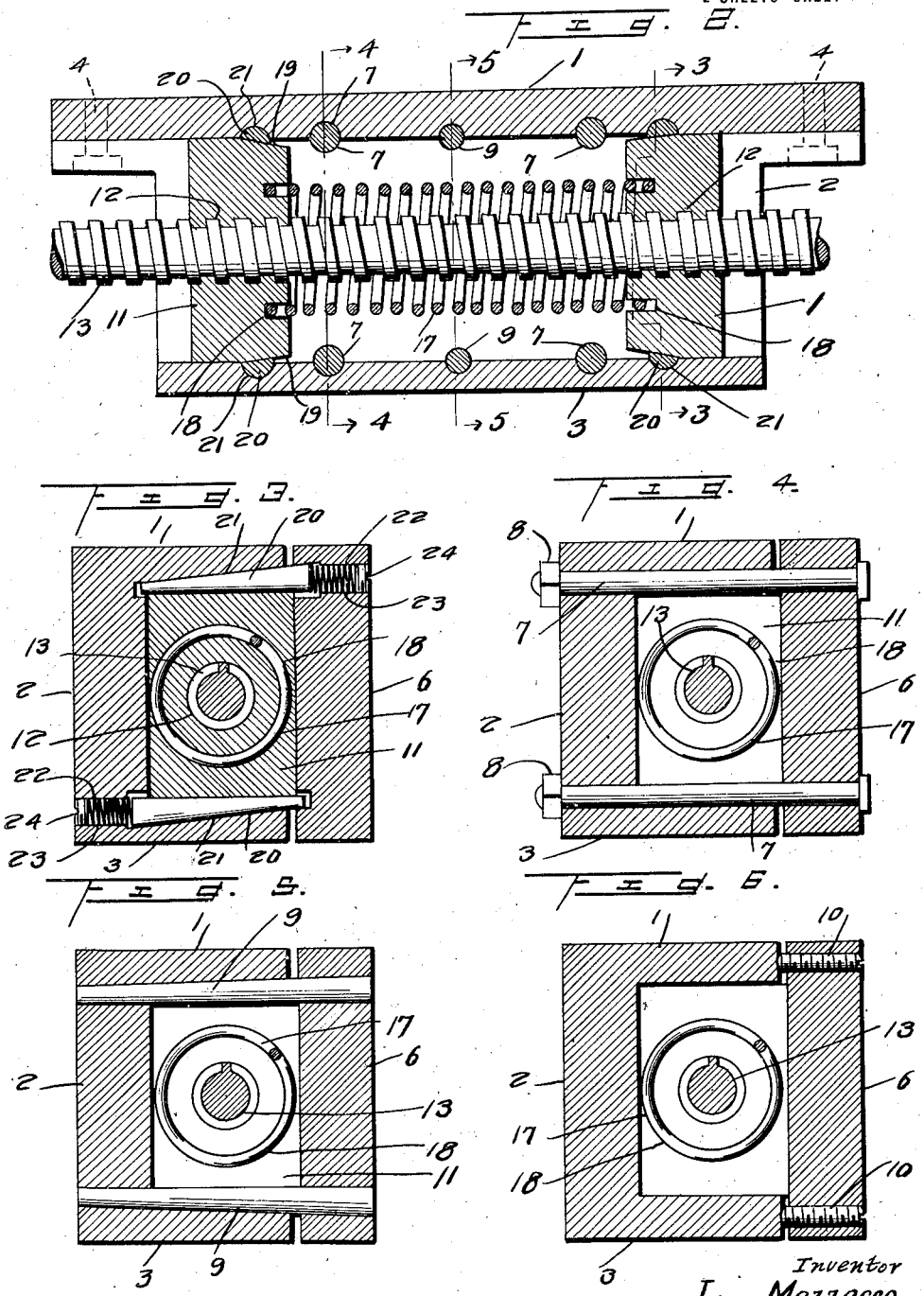

UNITED STATES PATENT OFFICE.

LEANDRO MAZZOCCO, OF LYNN, MASSACHUSETTS.

MEASURING DEVICE.

1,369,346.

Specification of Letters Patent. Patented Feb. 22, 1921.

Application filed April 9, 1920. Serial No. 372,597.

*To all whom it may concern:*

Be it known that I, LEANDRO MAZZOCCO, a subject of the King of Italy, residing at Lynn, in the county of Essex and State of Massachusetts, have invented certain new and useful Improvements in Measuring Devices; and I do hereby declare the following to be a full, clear, and exact description of the invention, such as will enable others skilled in the art to which it appertains to make and use the same.

This invention relates to certain new and useful improvements in measuring devices for lathes and for machines having feed screws for regulating scales, cutting knives, etc.

The primary object of the invention resides in the provision of means for use in connection with the feed screw for automatically taking up lost motion or back lash on feed and lead screws of precision machines.

Another object of the invention resides in the provision of a simple form of mounting and bearing for the feed screw or lead screw which will make it possible to quickly and accurately move the operating tools or precision scales of the machine or the work into proper position without unnecessary adjustment and readjustment of the parts to allow for lost motion or back lash as has heretofore been necessary when making fine adjustment to secure accuracy to the thousandth part of an inch.

The invention has for a further object, the provision of screw mounting and bearing means of the above stated character which will continually and automatically adjust itself during the wear of the parts and which latter may be readily replaced at a small cost in comparison to the cost of the other parts of the machine.

Other objects of the invention will appear as the description proceeds and it will be understood that the invention consists in the novel construction, arrangement and combination of coöperating parts, as hereinafter more specifically set forth, claimed and shown in the accompanying drawings forming a part of the application and in which:—

Figure 1 is a view of the invention as applied to one of the feed screws of a compound lathe slide rest, parts being broken away to show the feed screw mounting.

Fig. 2 is a vertical longitudinal section through the invention.

Fig. 3 is a transverse vertical section on the plane of line 3—3 of Fig. 2.

Fig. 4 is a similar view on the plane of line 4—4 of Fig. 2.

Fig. 5 is a transverse vertical section on the plane of line 5—5 of Fig. 2.

Fig. 6 is a detail transverse section showing the application of the set screws carried by the removable side of the casing.

Fig. 7 is a detail elevation of one of the wedge members removed.

Fig. 8 is an end elevation thereof.

Fig. 9 is a detail enlarged perspective of one of the bearing blocks removed.

Referring more in detail to the drawings in which similar reference characters designate corresponding parts throughout the several views, 1 indicates the upper plate of the bearing casing which is carried by the slide rest A, as shown in Fig. 1 of the drawings, and which slide rest has the screw graduation mechanism B and tool C mounted thereon in the usual manner. The upper plate of the bearing casing is formed with one side thereof designated by the numeral 2 and the bottom designated by the numeral 3. The upper plate 1 and the upper portions of the side 2 of the bearing casing are extended, as shown in Figs. 1 and 2 and suitable securing members 4 may be extended through the ends of the upper plate 1, as shown by dotted lines in Figs. 1 and 2 to retain the casing in proper position.

The removable side or closure member 6 of the casing corresponds to the side 2 in shape and size and forms the opposite side of the casing. This removable side 6 is connected with the side 2 by suitable bolts 7 extended through the sides 2 and 6 inwardly of the corner portions thereof, as clearly shown in Figs. 1, 2, and 4 of the drawings, portions of the bolts 7 passing through concaved grooves in the upper member 1 and lower member 3 of the casing, as shown clearly in Fig. 2 of the drawings. Suitable nuts 8 are mounted upon one end of the bolts 7, as shown in Fig. 4 of the drawings, while the head of the bolt engages the outer face of the removable side 6, as shown in Fig. 4 of the drawings. Central upper and lower dowel pins 9 are also extended through the removable side 6 and the rigid side 2 of the casing, as shown clearly in Figs. 1, 2 and 5 of the drawings, thereby connecting the central portions of the sides 2 and 6. Portions of the dowel pins 9 also rest in concaved transverse recesses 10' in the upper member 1 and lower member 3 of the casing, as shown in Fig. 2 of the drawings. Set screws 10 are carried by the removable side 6 and have their inner ends adapted for engagement with the edges of the upper member 1 and lower member 3 of the casing to adjust the position of the removable side 6 with respect to the side 2, for a purpose which will presently be apparent. While any suitable number of set screws 10 may be employed I have shown two upper set screws and lower set screws positioned at a point between the bolts 7 and the dowel pins 9 and in a plane above and below the members, as will be readily understood by referring to the drawings.

Positioned within the casing and adapted for sliding movement between the sides 2 and 6 are the end bearing blocks 11 which have threaded central apertures 12 and through which the feed screw or lead screw 13 is threaded, this screw carrying the usual handle 14 upon its outer end and having the scale 15 marked upon a flange 16 carried thereby, as is usual with screws of this character on various forms of precision machines, lathes and so forth. The bearing blocks 11 are adapted to be forced away from one another by means of a helical spring positioned in the casing and having its opposite ends engaged in concentric bearing grooves 18 formed in the inner faces of the bearing blocks 11, and clearly shown in Fig. 2 of the drawings. This spring 17 is spaced around the screw 13 so as not to interfere therewith and serves to resiliently force the bearing blocks 11 away from one another, thereby causing the blocks to bind upon opposite side edges of the threads of the screw 13, thereby eliminating lost motion or back lash in operation of the screw 13.

The bearing blocks 11 have a snug fitting between the upper plate 1 and the lower plate 3 and also between the stationary side 2 and the removable side 6 of the casing, thereby preventing play of the bearing blocks 11 in the casing. The side 6 is so adjusted by manipulation of the set screws 8 and the bolts 7 that the proper pressure of the side 6 upon the bearing blocks may be obtained, thereby holding the blocks in proper position without clamping them to such extent as to prevent downward longitudinal movement of the blocks with respect to the casing when necessary to take up automatically lost motion or back lash of the screws 13. It will be understood that the bearing blocks 11 are constructed of a material much softer than the screws 13 so that wear will be upon the blocks 11 instead of the screws 13 and these blocks may be readily replaced at a much lower cost than the screws 13 which may become worn to such an extent as to require replacement. The blocks 11 are provided with beveled portions 19 on their upper and lower faces, as shown clearly in Figs. 2 and 9 of the drawings and transversely movable wedge members 20 are extended across these beveled portions 19 and adapted to ride in concaved elongated recesses 21 in the upper plate 1 and lower plate 3, the upper and lower wedge members 20 riding in opposite directions, as shown in Fig. 3 of the drawings. Each wedge member 20 has its opposite ends extended into extensions of the recesses or grooves 21 so that the wedge member 20 may move freely across the beveled portions 19 of the bearing blocks 11. The wedge members 20 are forced across the beveled portions 19 by extension springs 22 positioned in the enlarged ends of the grooves or slots 21 or rather in pockets 23 formed in the sides 2 and 6, with one end of the springs 22 bearing against the enlarged end of the wedge member 20 entering the pockets 23 while the opposite end of the springs 22 bear against tension adjusting screw plugs 24 engaged in the outer ends of the pockets 23 to close the latter and also to adjust the tension of the springs 22 within the pockets 23. It will therefore be seen that the springs 22 serve to force the wedge members in one direction only across the beveled portions 19 of the bearing blocks 11 to retain the latter in outwardly forced position and prevent the bearing blocks 11 from returning toward one another after once having been forced outwardly by the spring 17. It will therefore be seen that the lost motion or back lash taken up automatically by this device will be taken up permanently and the spring 17 is constantly under tension to act automatically and force the bearing blocks 11 outwardly as they wear by rotation of the screw 13 through the same.

While the structure and operation of this device has been clearly and specifically set forth, it is believed that the advantage of this invention will be clearly apparent to those familiar with this art. It may be stated, however, that in turning from a rough piece of steel, on a precision lathe, a stud with two or more bodies, the first body to be turned would be the smallest in diameter, ascertaining the exact size by means of a micrometer, then coming back with the cutting tool and starting for the second or larger diameter body as with the first, by measuring with the micrometer until the exact size desired is obtained.

With the feed screw bearing disclosed in this application for taking up the lost motion or back lash occurring in the precision lathe, the exact size of the second or outer body could be obtained much quicker and just as accurately by reading the differences of the two bodies on the feed screw micrometer graduations, thereby eliminating much time heretofore required for measuring by the micrometer until the desired size was obtained. It will be evident to those familiar with this art that the self adjusting back lash device, as this invention may be termed will save time and unnecessary work in many operations to be performed in the precision lathe.

The invention will also be of value on the milling machine. For example, supposing three locating pins on a piercing die-punch block are required to be milled, say .380" x .380" on a straight line with a space between their center of .750". Ascertaining the accurate width of the milling cutter, the milling is started from a given point, for example, a straight edge of the punch block. The table is then fed in or out crosswise to the cutter until the first pin is milled to the required distance from the given point, reading the feed screw micrometer graduations. The table is again fed .380" plus the width of the cutter, but having too much stock to mill off for one cut in order to obtain an accurate dimension of the pin, the table must be fed, say .010" over, and this cut obtained, the table must be fed in the reverse direction. Not having the back lash in the feed screw to deal with, the operator can fearlessly rely on the feed screw micrometer graduations for accuracy, hence this part of the operation being finished, the feed screw is again reversed and the space between the pins is obtained and so forth, until all the pins are milled and the punch block is then turned on the miller-table at an angle of 90 degrees to the former position in order to mill the other side of the pins. It will therefore be seen that the operator can with this feature incorporated in the machine, start the work from one given point and obtain the accurate results from said given point throughout the operation, regardless of the necessity of reversing the feed screw.

By having this back lash device on both the saddle feed screw, which moves the table of a vertical miller toward and away from the miller frame, and the table feed screw, which moves the table at right angles to the latter's movement, holes may be drilled accurately by the miller and by virtue of the back lash being eliminated from the feed screw, the operations on the milling machine would be in a greater range than heretofore possible.

From the foregoing, it will be clearly apparent that this invention may be applied to various forms of milling machines, lathes and the like and while the preferred embodiment of the invention has been illustrated and described, minor changes in the details of construction and arrangement of the parts may be resorted to within the scope of the appended claims without departing from the spirit of the invention.

What is claimed is:—

1. A measuring device comprising the combination with a feed screw of a precision machine, of a casing surrounding a portion of said feed screw, opposed bearing members within said casing and adapted to act upon opposite faces of the threads of said screw, means for automatically adjusting said bearing members to take up the wear and prevent back lash when the screw is reversed, means for automatically locking said bearing members from returning toward their pre-adjusted position, and means for resiliently acting upon the last mentioned means to retain the same in operative position.

2. A measuring device comprising the combination with the feed screw of a precision machine, of a bearing casing for said feed screw, spaced bearing members for the screw within said casing, means for adjusting said bearing members and exerting a continual pressure thereon to cause action of the bearing members upon opposite faces of the screw threads, said bearing members having beveled portions, cam members engaged with said beveled portions to prevent said bearing members from returning toward their pre-adjusted position, said casing having guide grooves for said cam members, and means for automatically moving said cam members across said beveled portions of the bearing members to retain the latter in operative position.

3. A measuring device comprising the combination with a feed screw of a precision machine, of a bearing casing surrounding a portion of said screw, bearing members for said screw mounted for longitudinal movement in said casing, means engaged with said bearing members for adjusting the same and thereby causing the bearing members to act upon opposite faces of the threads of said screw to take up lost motion and prevent back lash during rotation of said screw in either direction to adjust the measuring device, said bearing casing having a removable side, means for mounting said removable side on the remainder of said casing, means for adjusting said side with respect to said remainder of the casing, oppositely moving wedge members carried by said casing to retain said bearing members in their pre-adjusted position, and means carried by said casing for automatically forcing the last mentioned wedge members across the path of said bearing members.

4. A measuring device comprising the combination with the feed screw for a precision machine, of a casing surrounding a portion of said screw, said casing including a main portion and a removable side, bearing blocks movable longitudinally within said casing, means for connecting said removable side with the main portion of said casing, means for adjusting said removable side with respect to said main portion of the casing, said screw being threaded through said bearing blocks, means within said bearing casing for adjusting said bearing blocks and causing the blocks to bind upon opposite sides of the threads of said screw to automatically take up lost motion and prevent back lash during adjustment of the screw, and means within said casing to prevent said bearing blocks from returning toward their pre-adjusted position, the means for adjusting said bearing blocks having its opposite ends engaged in grooves therefor formed in said bearing blocks.

5. A measuring device comprising the combination with the feed screw of a precision machine, of a casing having a removable side, a pair of bearing members adjustable with respect to one another within said casing, means for drawing said movable side of the casing toward the opposite side of the casing to retain said bearing members in proper position and prevent movement of said bearing members transversely within said casing, said feed screw being threaded through said bearing members, means for forcing said bearing members outwardly in opposite directions upon said feed screw to cause said bearing members to act upon opposite sides of the thread of said screw, and means to prevent return of said bearing members toward one another upon said feed screw.

In testimony whereof I affix my signature in presence of two witnesses.

LEANDRO MAZZOCCO.

Witnesses:
MARIA MAZZOCCO,
ANTHONY CARAZZA.